Dec. 11, 1934.  W. C. STARKEY  1,983,824
SPRING CLUTCH
Filed Jan. 7, 1931
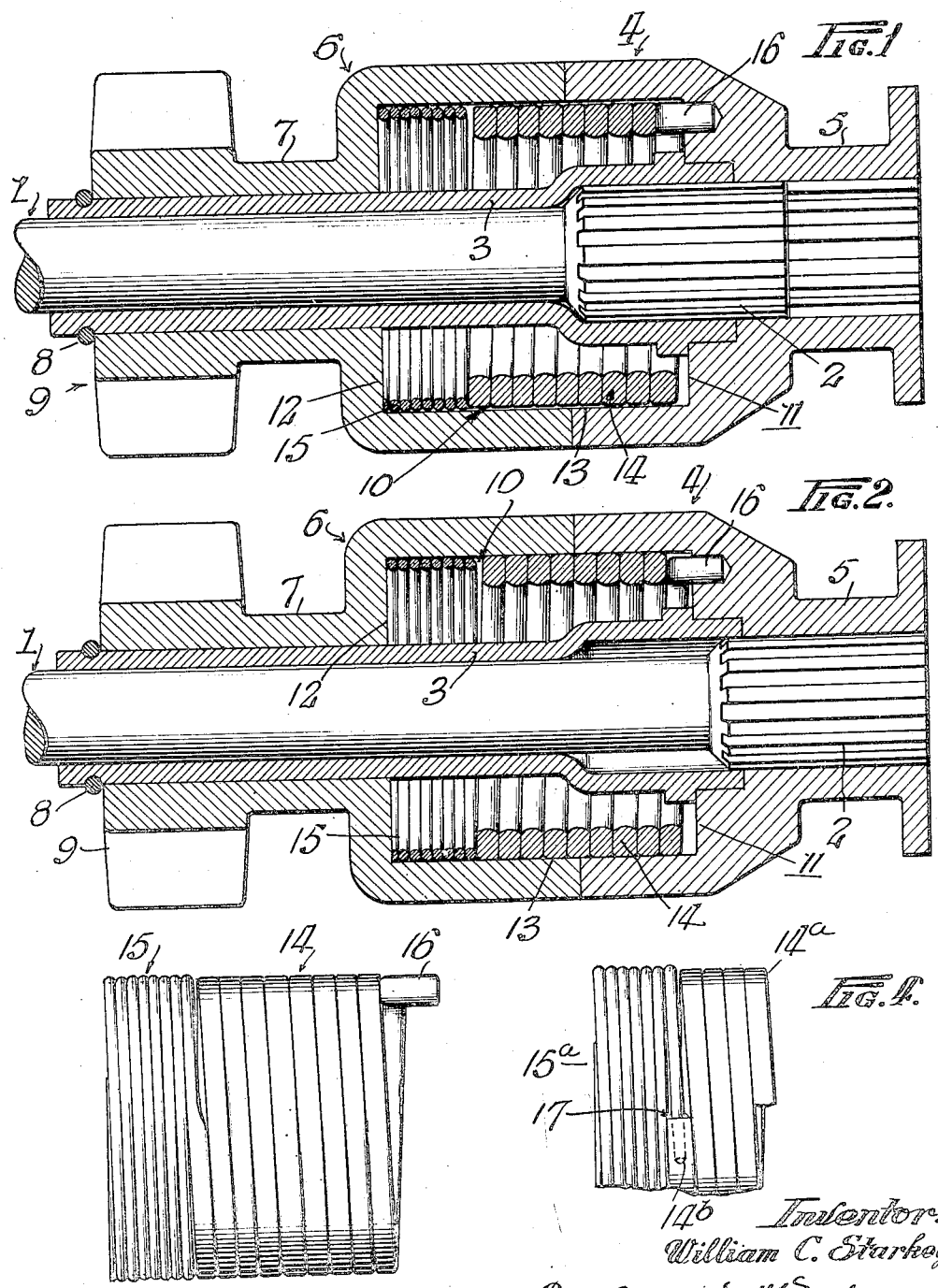
Inventor:
William C. Starkey,
By Arthur W. Moore
Att'y.

Patented Dec. 11, 1934

1,983,824

UNITED STATES PATENT OFFICE 1,983,824

SPRING CLUTCH

William C. Starkey, Indianapolis, Ind., assignor to L. G. S. Devices Corporation, Indianapolis, Ind., a corporation of Indiana Application January 7, 1931, Serial No. 507,060

10 Claims. (Cl. 192—41)

This invention relates to improvements in spring clutches and it consists of the matters hereinafter described and more particularly pointed out in the appended claims.

A clutch of this kind with which my invention is more particularly concerned, embodies two coaxial cup shaped members providing a recess in which is located a helical spring arrangement adapted to permit a comparatively free relative rotation between said cup members in one direction but to radially expand or be radially expanded into engagement with the annular wall of said recess upon a relative rotation between said cup members in the other direction to clutch said members together.

The primary object is to increase the life and efficiency of a clutch of this kind, to provide lighter overrunning characteristics therein and less wear and greater sensitivity and at the same time provide a clutch of this kind which remains unaffected so far as this sensitivity is concerned under unfavorable conditions in the recess such as the congealing or stiffening of the lubricant at low temperatures with which the recess is packed.

These objects of the invention as well as others, together with the many advantages thereof will more fully appear as I proceed with my specification.

In the drawing:—

Fig. 1 is a longitudinal vertical sectional view through a clutch of this kind, embodying my invention with the parts in a position wherein one cup member may overrun the other cup member.

Fig. 2 is a view similar to Fig. 1 showing the relative position of the parts as when the clutching spring has radially expanded upon a relative rotation of the cup members to clutch them together.

Fig. 3 is a view in side elevation of one type of a duplex clutch spring which may be advantageously used in my improved clutch.

Fig. 4 is a view in side elevation of a modified form of clutch spring that may also be advantageously used in my improved clutch.

The invention is herein illustrated and described as embodied in the pinion unit of an engine starter but as will be apparent it may also be embodied in other mechanisms when the peculiar advantages of the invention make it desirable to do so.

Referring now in detail to that embodiment of the invention illustrated in the accompanying drawing:—1 indicates as a whole the driven shaft of an automobile or like engine starting motor, having a splined part 2 of enlarged diameter at that end remote from said motor. On said shaft is mounted a bearing sleeve or bushing 3. A cup shaped clutch member 4 is provided at one end with a hub 5 having a splined connection with the splined part 2 of the shaft 1. A second clutch member 6 has a hub 7 at one end that is journalled on the sleeve 3 and is held against an endwise movement in one direction thereon by a spring retaining ring 8 suitably engaged in an annular groove in said sleeve. On said hub is formed the pinion 9 which in an endwise movement of both cup shaped members toward the starting motor is adapted to be moved into engagement with the fly wheel ring gear (not shown) of the engine to be started.

Both cup shaped members are formed at their abutting ends to provide a clutch spring recess 10 having flat ends 11 and 12 respectively and an annular clutch surface 13.

In said recess is located a main clutch spring 14 with a secondary or energizing spring 15 at one end thereof. Preferably the main clutch spring when in its normal unstressed condition is of a diameter slightly less than that of the recess so as to have a clearance with respect thereto as best shown in Fig. 1. Said spring is made of relatively heavy stock and one end thereof is bent to form a toe 16 engaged in a pocket in the end wall 11 of the clutch recess 10. Each turn of this main clutch spring has flat sides thus permitting the use of an increased number of turns in said spring for a recess of the desired length.

The secondary or energizing spring 15 which is preferably of an axial length less than that of the main clutch spring, is normally of a slightly larger diameter than said main clutch spring and is made of spring stock of a cross sectional area less than that of the main clutch spring and is therefore more sensitive in its action. The diameter of said secondary spring approximates that of the clutch surface 13 of the recess so as to engage the same with a light overrunning action.

One end of said secondary spring is ground flat to engage the flat end 12 of the recess and said spring may be made either as an integral part of the main clutch spring as shown in Fig. 3 or it may be made as a separate element and then secured to the main clutch spring as shown in Fig. 4.

When the secondary spring is an integral part of the main spring, then the stock from which said spring as a whole is made must be of a lesser cross section at one end than the other as is apparent. Such a length of spring stock or wire can be readily drawn and the part of heavier diameter is flattened upon opposite sides before winding said lengths of stock into spring form. In Fig. 4 the spring is shown as made of two separate lengths of wire of different cross sectional areas and the part 14ᵃ of larger cross sectional area is provided at one end with an axial recess 14ᵇ to receive one end of the part 15ᵃ of smaller cross sectional area, secured in place by welding as at 17 or in any other suitable manner.

Assume that with the parts shown in the position in Fig. 1, the starting motor is energized to rotate the shaft 1. By means of the splined connection between said shaft and the hub 5 of the cup shaped member 4 said member is rotated in the proper direction.

This rotation of said cup member will through the main clutch spring 14 act to unwind the secondary or energizing spring 15, to cause it to engage the annular surface 13 of the recess 10 and will act to hold that end of the main clutch spring to which it is connected. With said end of the main clutch spring thus held against movement and with energy imparted to the first mentioned end thereof, said spring will unwind and radially enlarge or expand from that end thereof held by the energizing spring. This unwinding will proceed progressively throughout the various turns of the main spring which grips against said surface of the recess to clutch both cup shaped members together.

When the cup shaped member 6 is rotated in the proper direction at a speed greater than that of the cup shaped member 4, this will act to wind up the secondary or energizing spring 15 and reduce its diameter and this will impart a like action to the main spring 14 so that an overrunning is possible between the two cup shaped members.

By employing the relatively light energizing spring, a light overrunning action is assured because of its small dragging action and as will be apparent it is practical to make the main spring slightly undersized when in its normal condition, with respect to the associated surface of the clutch members. With the energizing spring, sensitivity of operation of the main clutch spring is assured and all turns of said main spring are caused to be equally expanded so that the clutching action is equally distributed throughout the entire length of the main clutch spring and is therefore uniform.

Again, the use of such an energizing spring reduces the number of parts required in a clutch of this kind with a resulting reduction in manufacturing costs.

In addition to the above, another advantage of the smaller energizing spring is that it enables the placing of more turns of a spring in the same total axial length of pocket. The total number of turns (regardless of their size) is an all-important factor in securing the greatest amount of holding power in all such spring clutches. Again, it is often desirable to keep axial length to a minimum.

It is also pointed out that when the lubricant with which the clutch is filled, congeals and stiffens up under low temperatures, the energizing spring because of its small cross sectional diameter, i. e. because the individual turns are made narrower, easily cuts through the same so that the resistance ordinarily offered by the lubricant in this condition is readily overcome. Thus the clutch is positive and sensitive under low temperature conditions. In other words this construction gives added assurance of positive locking when used in the presence of stiff oils at low temperature.

While in describing the invention, I have referred in detail to the form, arrangement and construction of the parts thereof, the same is to be considered merely as illustrative so that I do not wish to be limited thereto except as may be specifically set forth in the appended claims.

I claim as my invention:—

1. A spring clutch embodying therein two relatively rotatable clutch members, a clutch spring embodying therein a main clutching portion comprising a plurality of spring turns and an energizing portion at one end of the main clutching portion, means connecting a part of said main clutching portion with one of said members so as to be rotative therewith, the other member having a surface arranged to be gripped by said main clutching portion upon a change in its diameter in one direction, the energizing portion comprising at least one complete spring turn directly connected to the end of one spring turn of the main clutching portion and having a normal diameter different from that of and being more resilient than the turns in the main clutching portion and made of stock of a cross sectional thickness less than that of the main clutching portion of said spring, said energizing portion of said spring in a relative rotation between the clutch members in one direction operating to clutch against said surface to energize said main clutching portion into clutching engagement with said surface to clutch said two members together.

2. A spring clutch embodying therein two relatively rotatable clutch members, one of which has a clutching surface, a clutch spring having a load carrying portion and an energizing portion with a part of the first mentioned portion operatively engaged with said other member so as to be rotative therewith, the said energizing portion comprising a lesser number of turns than the load carrying portion and being directly connected to one end of the load carrying portion, said energizing portion having a normal diameter greater than that of and being more resilient than said load carrying portion and made from stock of lesser cross sectional area, said energizing portion of said spring in a relative rotation between said clutch members in one direction operating to clutch against said surface to energize said load carrying portion of the spring into clutching engagement with said surface to clutch said two clutch members together.

3. A spring clutch embodying therein two relatively rotatable clutch members, one of which has a clutching surface, a clutch spring including a load carrying portion having a normal clearance with respect to said surface and an energizing portion comprising at least one complete turn having a slight frictional drag against said surface, said load carrying portion being operatively engaged with said other member so as to be rotative therewith and said energizing portion having a greater normal diameter but made of stock of less cross sectional area and therefore being more resilient than said load carrying portion, said energizing portion operating in a relative rotation between said clutch members in one direction to increase its frictional drag against said surface to one gripping said surface so as to energize the load carrying portion of the spring into clutching engagement with said surface to clutch said two members together.

4. A spring clutch embodying therein two relatively rotatable clutch members, one of which has a clutching surface, a clutch spring including a load carrying portion, one end of which is operatively engaged with the other of said members and an energizing portion comprising at least one complete turn extending axially outward from the other end of said load carrying portion, said energizing portion which has a lesser number of turns than said load carrying portion being more resilient than said load carrying portion and being oversize with respect to said surface to have a slight frictional drag engagement therewith and operating in a relative rotation between said clutch members in one direction to change its diameter and grip said surface in a manner causing the load carrying portion to also change its diameter and grip said surface to clutch said two members together.

5. A spring clutch embodying therein two relatively rotatable clutch members, one of which has a clutching surface, a clutch spring including a load carrying portion, one end of which is operatively engaged with the other of said members and an energizing portion comprising less turns than the load carrying portion directly fixed to and extending axially outward from the other end of said load carrying portion, said energizing portion which is made of stock of a cross sectional area less than that of the load carrying portion having a normal diameter greater than that of and being more resilient than said load carrying portion and normally having a slight frictional drag engagement with said surface and operating in a relative rotation between said clutch members in one direction to cause said load carrying portion to change its diameter and grip said surface in a manner clutching said clutch members together.

6. A spring clutch embodying therein two relatively rotatable clutch members cooperating to provide a clutch spring recess with an internal gripping surface, a clutch spring in said recess and including a load carrying portion and an energizing portion, said load carrying portion being operatively connected at one end to one of said clutch members and having a normal clearance with respect to said surface, the energizing portion which is made of stock of less cross sectional area than that of said load carrying portion extending outwardly beyond the other end of said load carrying portion and having a normal slight frictional drag engagement with said surface and operating in a relative rotation between said clutch members to increase its grip upon said surface and cause said load carrying portion to expand radially into clutching engagement with said surface to clutch said two clutch members together.

7. A spring clutch embodying therein two relatively rotatable clutch members, a clutch spring having a load carrying portion and an axially extending energizing portion having a lesser number of turns than said load carrying portion which is so operatively engaged with one of said members as to be rotative therewith, the other member having a surface arranged to be gripped by said spring upon a change in its diameter in one direction, the energizing portion which is made of stock of a lesser cross sectional area extending axially from one end of said load carrying portion and having a normal diameter greater than that of and being more resilient than said load carrying portion of said spring, said energizing portion of said spring in a relative rotation between the clutch members in one direction operating to clutch against a part of said clutch member having said surface to energize said load carrying portion into clutching engagement with said surface to clutch said two members together.

8. A spring clutch embodying therein two relatively rotatable clutch members, one of which has a clutching surface, a clutch spring including a load carrying portion having a normal clearance with respect to said surface and a directly connected energizing portion of larger diameter than said surface and having a slight frictional drag thereagainst, said load carrying portion being operatively engaged with said other member so as to be rotative therewith and said energizing portion which is made of stock of a lesser cross sectional area being more resilient than said load carrying portion operating in a relative rotation between said clutch members in one direction to increase its frictional drag against said surface to one gripping against the same so as to energize the load carrying portion of the spring into clutching engagement with said surface to clutch said two members together.

9. A spring clutch embodying therein two relatively rotatable clutch members, one of which has a clutching surface, a clutch spring including a load carrying portion, one end of which is operatively engaged with the other of said members and an energizing portion extending axially outward from the other end of said load carrying portion, said energizing portion comprising less turns than the load carrying portion and having a normal diameter greater than that of and being made from lighter cross sectional stock so as to be more resilient than said load carrying portion, said energizing portion having a slight frictional drag engagement with a part of said member having said surface and operating in a relative rotation between said clutch members in one direction to cause said load carrying portion to change its diameter and grip said surface in a manner clutching said clutch members together.

10. In a spring clutch, the combination of a clutch spring and two relatively rotatable members, said spring having a load carrying portion operatively connected for rotation with one of said members, one of said members having a surface against which said load carrying portion clutchingly engages when transmitting a load but with which it normally has a clearance, said spring also having a more resilient energizing portion of less turns but of a greater diameter different than that of said load portion and made of lighter stock than said load carrying portion and normally engaging a cooperating surface part of one of said members.

WILLIAM C. STARKEY.